(12) United States Patent
Kasuya

(10) Patent No.: US 12,697,967 B2
(45) Date of Patent: Aug. 4, 2026

(54) EVALUATION APPARATUS, EVALUATION METHOD, AND NON-TRANSITORY COMPUTER-READABLE STORAGE MEDIUM

(71) Applicant: NEC Corporation, Tokyo (JP)

(72) Inventor: Tsukasa Kasuya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 18/723,884

(22) PCT Filed: Jan. 7, 2022

(86) PCT No.: PCT/JP2022/000364

§ 371 (c)(1),
(2) Date: Jun. 25, 2024

(87) PCT Pub. No.: WO2023/132055

PCT Pub. Date: Jul. 13, 2023

(65) Prior Publication Data

US 2025/0083669 A1      Mar. 13, 2025

(51) Int. Cl.
*B60W 30/095*          (2012.01)
(52) U.S. Cl.
CPC .... *B60W 30/0956* (2013.01); *B60W 30/0953* (2013.01); *B60W 2552/53* (2020.02);
(Continued)
(58) Field of Classification Search
CPC ............... B60W 30/08; B60W 30/095; B60W 30/0953; B60W 30/0956; B60W 40/08;
(Continued)

(56) References Cited

U.S. PATENT DOCUMENTS

| | | | |
|---|---|---|---|
| 10,553,115 B1 * | 2/2020 | Ismaili | ................. G08G 1/0967 |
| 2005/0090983 A1 * | 4/2005 | Isaji | ...................... G08G 1/166 |
| | | | 340/436 |

(Continued)

FOREIGN PATENT DOCUMENTS

| | | |
|---|---|---|
| JP | H08-178712 A | 7/1996 |
| JP | 2001-357498 A | 12/2001 |

(Continued)

OTHER PUBLICATIONS

International Search Report for PCT Application No. PCT/JP2022/000364, mailed on Feb. 8, 2022.

*Primary Examiner* — Brandon Z Willis
(74) *Attorney, Agent, or Firm* — Sughrue Mion, PLLC

(57) ABSTRACT

An evaluation apparatus (10) includes an acquisition unit (110), a determination unit (120), and an evaluation unit (130). The acquisition unit (110) acquires detection information indicating a result of detecting a periphery of a vehicle by a sensor, and travel information of the vehicle. The determination unit (120) determines, by using the detection information, whether there is a possibility of collision between the vehicle and another object. The evaluation unit (130) determines, by using the travel information at a time when the possibility of collision is detected by the determination unit (120), whether a driver of the vehicle has performed an operation for reducing the possibility of collision, and evaluates the driver based on a result of the determination.

19 Claims, 4 Drawing Sheets

(52) U.S. Cl.
CPC ............... *B60W 2554/4041* (2020.02); *B60W 2554/4044* (2020.02)

(58) Field of Classification Search
CPC ............. B60W 40/09; B60W 50/0097; B60W 2540/30; B60W 2552/53; B60W 2554/4026; B60W 2554/4029; B60W 2554/4041; B60W 2554/4044; G08G 1/16; G08G 1/166
See application file for complete search history.

(56) References Cited

U.S. PATENT DOCUMENTS

| | | | |
|---|---|---|---|
| 2017/0091872 A1* | 3/2017 | Okumura | ............... G06Q 40/08 |
| 2017/0101093 A1* | 4/2017 | Barfield, Jr. | ....... G08G 1/09675 |
| 2021/0244326 A1* | 8/2021 | Nishimura | ............... A61B 5/18 |
| 2022/0111865 A1* | 4/2022 | Lawrence | .......... G01C 21/3602 |

FOREIGN PATENT DOCUMENTS

| | | | |
|---|---|---|---|
| JP | 2015-022499 A | 2/2015 |
| JP | 2015-055921 A | 3/2015 |
| JP | 2018-031878 A | 3/2018 |
| JP | 2019-079396 A | 5/2019 |
| JP | 2020-123214 A | 8/2020 |
| JP | 2021-128545 A | 9/2021 |

* cited by examiner

<u>10</u>

START

ACQUIRE DETECTION INFORMATION
AND TRAVEL INFORMATION — S10

DETERMINE TIMING WHEN THERE
IS A POSSIBILITY OF COLLISION — S20

DETERMINE TRAVEL INFORMATION
OF DETERMINED TIMING — S30

GENERATE EVALUATION INFORMATION — S40

STORE EVALUATION INFORMATION, IN
ASSOCIATION WITH
IDENTIFICATION INFORMATION — S50

END

1

EVALUATION APPARATUS, EVALUATION METHOD, AND NON-TRANSITORY COMPUTER-READABLE STORAGE MEDIUM

This application is a National Stage Entry of PCT/JP2022/000364 filed on Jan. 7, 2022, the contents of all of which are incorporated herein by reference, in their entirety.

TECHNICAL FIELD

The present invention relates to an evaluation apparatus, an evaluation method, and a program.

BACKGROUND ART

In recent years, a vehicle being equipped with an imaging apparatus has increased. Application of an image generated by the camera is varied.

For example, Patent Document 1 describes the following technique. First, a vehicle driving support apparatus analyzes a moving direction, moving velocity, and the like of a pedestrian or a bicycle, based on an image generated by an imaging apparatus. Then, the vehicle driving support apparatus further weights a result of the analysis, computes a degree of a possibility that a vehicle collides with the pedestrian or the bicycle, and outputs an image or sound that alert to the collision, according to the possibility.

Further, Patent Document 2 describes a driving evaluation system that performs evaluation of driving. The driving evaluation system determines a driving operation performed on a vehicle, based on vehicle operation information detected by an in-vehicle device mounted on the vehicle. Then, the driving evaluation system determines, retrospectively from a time point when the driving operation is determined, whether a driver of the vehicle has performed a safety confirmation act, and evaluates driving by the driver, based on a result of the determination. In Patent Document 2, the in-vehicle device is equipped with a camera, and recognizes a traveling lane and the like by using an image from the camera.

Patent Document 3 also describes an information processing apparatus that performs evaluation of driving. The information processing apparatus acquires travel information indicating a traveling state of a first vehicle traveling on a road, and determines one or more driving operation by a driver driving the first vehicle by using the travel information at a time when an emergency vehicle approaches the first vehicle. When detecting the approach of the emergency vehicle, the information processing apparatus uses an image from a camera mounted on the first vehicle. Then, the information processing apparatus performs evaluation on safety of driving by a driver by using a result of the determination. Further, the information processing apparatus acquires a first evaluation result for a first predetermined period, compares the first evaluation result with a second evaluation result for a second predetermined period being prior to the first predetermined period, and updates the second evaluation result, based on a result of the comparison.

Further, Patent Document 4 describes a driving characteristic determination apparatus. The driving characteristic determination apparatus is used together with an in-vehicle communication apparatus. The in-vehicle communication apparatus transmits information acquired from an in-vehicle camera and the like, and information on an operation performed on an accelerator, a blinker, or the like, to the driving characteristic determination apparatus. The driving characteristic determination apparatus detects occurrence of an event related to travel of a vehicle, based on an image captured by the in-vehicle camera received from the in-vehicle communication apparatus, and determines, as a driving characteristic, whether an appropriate driving operation is performed in response to the event.

Further, Patent Document 5 discloses a driving evaluation apparatus being capable of, when there is a person by a pedestrian crossing without a traffic light and a vehicle passes the pedestrian crossing without slowing down or stopping, automatically reflecting the driving on an evaluation. When executing the processing, the driving evaluation apparatus uses an image recorded on a drive recorder.

RELATED DOCUMENTS

Patent Documents

Patent Document 1: Japanese Patent Application Publication No. 2021-128545
Patent Document 2: Japanese Patent Application Publication No. 2020-123214
Patent Document 3: Japanese Patent Application Publication No. 2019-079396
Patent Document 4: Japanese Patent Application Publication No. 2015-22499
Patent Document 5: Japanese Patent Application Publication No. 2015-55921

SUMMARY OF INVENTION

Technical Problem

An inventor of the present invention has examined evaluating a driver by using a new index not being described in the above-described Patent Documents. One example of an object of the present invention is to evaluate a driver by using a new index.

Solution to Problem

According to one aspect of the present invention, an evaluation apparatus is provided, including:
an acquisition unit that acquires detection information indicating a result of detecting a periphery of a vehicle by a sensor, and travel information of the vehicle;
a determination unit that determines, by using the detection information, whether there is a possibility of collision between the vehicle and another object; and
an evaluation unit that determines, by using the travel information at a time when the possibility of collision is detected, whether a driver of the vehicle has performed an operation for reducing the possibility of collision, and evaluated the driver based on a result of the determination.

According to one aspect of the present invention, an evaluation method is provided, including,
by a computer executing:
acquisition processing of acquiring detection information indicating a result of detecting a periphery of a vehicle by a sensor, and travel information of the vehicle;
determination processing of determining, by using the detection information, whether there is a possibility of collision between the vehicle and another object; and
evaluation processing of determining, by using the travel information at a time when the possibility of collision is detected, whether a driver of the vehicle has performed an operation for reducing the possibility of collision, and evaluating the driver based on a result of the determination.

According to one aspect of the present invention, a program is provided, causing a computer to include:

an acquisition function of acquiring detection information indicating a result of detecting a periphery of a vehicle by a sensor, and travel information of the vehicle;

a determination function of determining, by using the detection information, whether there is a possibility of collision between the vehicle and another object; and an evaluation function of determining, by using the travel information at a time when the possibility of collision is detected, whether a driver of the vehicle has performed an operation for reducing the possibility of collision, and evaluating the driver based on a result of the determination.

Advantageous Effects of Invention

According to one aspect of the present invention, a driver can be evaluated by using a new index.

BRIEF DESCRIPTION OF THE DRAWINGS

The above-described object, other objects, features and advantages are further clarified by a preferred example embodiment described below and drawings accompanying thereto.

EXAMPLE EMBODIMENT

Hereinafter, an example embodiment of the present invention is described with reference to the drawings. Note that, in all the drawings, a similar component is denoted with a similar reference sign, and description thereof is omitted as appropriate.

Figure 1:
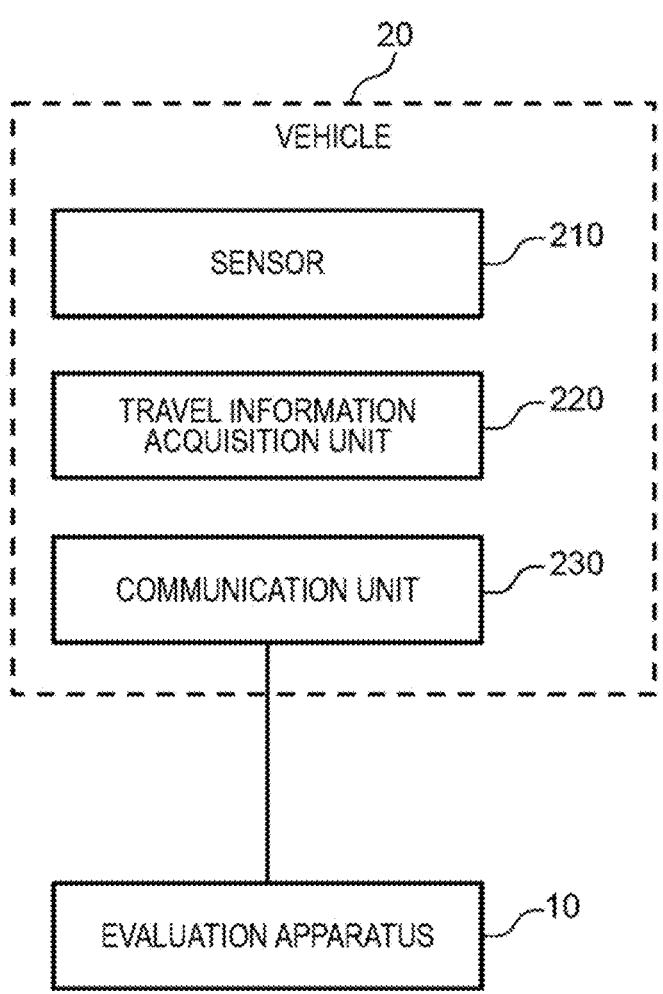
FIG. 1 It is a diagram for describing a usage environment of an evaluation apparatus according to an example embodiment.

FIG. 1 is a diagram for describing a usage environment of an evaluation apparatus 10 according to the example embodiment. The evaluation apparatus 10 evaluates a driver who drives a vehicle 20 that is, for example, a car, a bus, or a motorcycle. In this occasion, the evaluation apparatus 10 uses a result of detection by a sensor 210 mounted on the vehicle 20 and travel information of the vehicle 20. As described below in details, the travel information is acquired by a travel information acquisition unit 220.

The sensor 210 includes, for example, at least one of an imaging apparatus and a distance measurement apparatus, and generates information indicating an object located in a periphery of the vehicle 20. One example of the distance measurement apparatus is a LiDAR. Hereinafter, this information is referred to as detection information. The sensor 210 may include a millimeter wave radar, in addition to or instead of at least one of the imaging apparatus and the distance measurement apparatus. A flame rate of the imaging apparatus included in the sensor 210 is, for example, equal to or more than one frame per second (fps) and equal to or less than 30 fps, but is not limited to this range.

When the sensor 210 includes an imaging apparatus, the imaging apparatus may generate an image by using visible light, or may be generate an image by using infrared light. Further, the detection information may be an image itself generated by the imaging apparatus, may be a result of processing the image, for example, at least one of a position and a type of an object, or may be both the position and type of the object. A type of an object detected by the sensor 210 includes, for example, at least one of a vehicle, a pedestrian, a traffic sign, a traffic light, and a road surface marking. Herein, another vehicle includes at least one of a car, a bus, a motorcycle, and a bicycle. Further, the road surface marking includes at least one of a letter, a number, a symbol, and a line, drawn on a road. Further, when another object is a moving object such as a vehicle or a pedestrian, the detection information includes a moving direction and speed of the moving object.

When the sensor 210 includes a distance measurement apparatus, the detection information may be point cloud data generated by the distance measurement apparatus, may be a result of processing the point cloud data, for example, a position or a type of an object, or may be both the position and the type of the object.

The vehicle 20 includes the travel information acquisition unit 220 and a communication unit 230, in addition to the sensor 210.

The travel information acquisition unit 220 acquires travel information of the vehicle 20. The travel information includes, for example, a travel history of the vehicle 20, that is, a position of the vehicle 20 for each time, and velocity, acceleration, and control information of the vehicle 20 at each time. The control information includes an operation that a driver of the vehicle 20 has performed in order to control the vehicle 20, for example, an operation on a brake pedal, an operation on an acceleration pedal, an operation on a steering wheel, an operation on a blinker, and an operation on a light. The travel information is generated by, for example, an apparatus being preliminarily mounted on the vehicle 20.

Further, the travel information may include route guidance information provided to a driver of the vehicle 20. The route guidance information indicates a route to be proceeded by the vehicle 20. The travel information acquisition unit 220 acquires the route guidance information, for example, from a navigation apparatus mounted on the vehicle 20, or from a portable terminal carried by a passenger of the vehicle 20.

The communication unit 230 transmits the detection information generated by the sensor 210 and the travel information acquired by the travel information acquisition unit 220 to the evaluation apparatus 10, together with identification information that identifies the vehicle 20 or a driver. The evaluation apparatus 10 evaluates a driver of the vehicle 20 by using the detection information and the travel information. Note that, identification information is preliminarily stored in the communication unit 230.

In the example illustrated in the present drawing, the evaluation apparatus 10 is located outside the vehicle 20. In this case, the evaluation apparatus 10 is, for example, a cloud server. However, at least some functions of the evaluation apparatus 10, for example, all functions may be mounted inside the vehicle 20.

Figure 2:
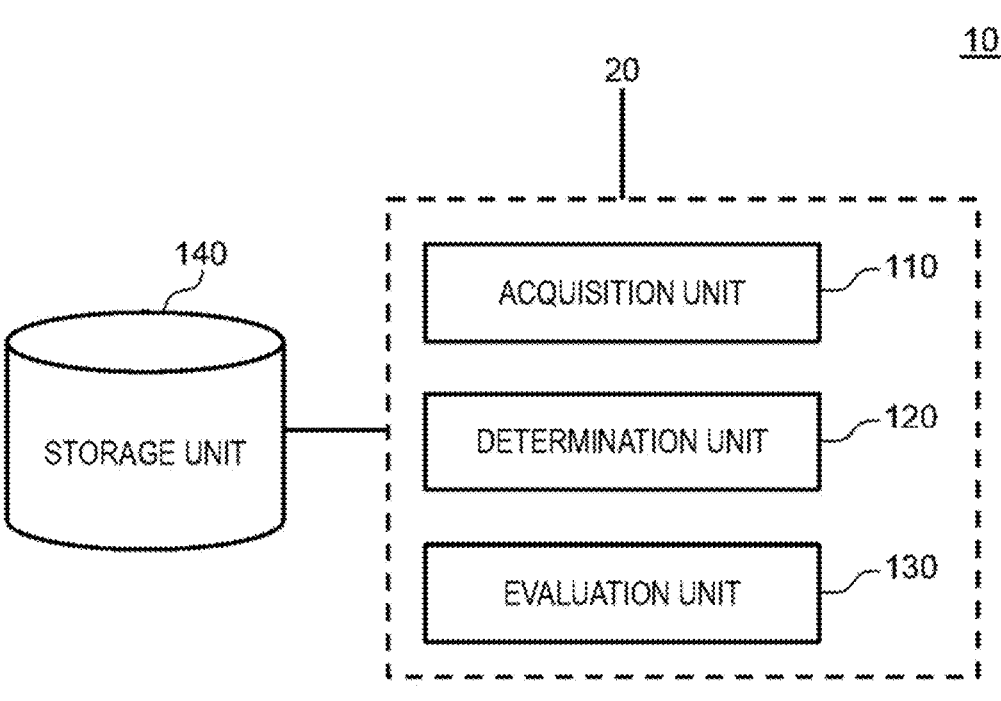
FIG. 2 It is a diagram illustrating one example of a functional configuration of the evaluation apparatus.

FIG. 2 is a diagram illustrating one example of a functional configuration of the evaluation apparatus 10. The evaluation apparatus 10 includes an acquisition unit 110, a determination unit 120, and an evaluation unit 130, and is capable of using a storage unit 140. In the example illustrated in the present drawing, the storage unit 140 is a part of the evaluation apparatus 10, however, the storage unit 140 may be located outside the evaluation apparatus 10.

The acquisition unit 110 acquires the identification information, the detection information, and the travel information from the communication unit 230 of the vehicle 20. The acquisition unit 110 may acquires these pieces of information in real time, or may be acquire these pieces of information via batch processing. In the latter case, the acquisition unit 110 may acquire the above described information, for example, when a power source of the vehicle 20, such as an engine or a motor, is turned off. The acquisition unit 110 stores the information acquired from the communication unit 230 in the storage unit 140, and also reads these pieces of information from the storage unit 140 when evaluation of a driver is performed.

The determination unit 120 determines whether there is a possibility of collision between the vehicle 20 and another object, by using at least the detection information. When the detection information includes an image but does not include an analysis result of the image, the determination unit 120 processes the image, and thereby determines a position and a type of an object located in a periphery of the vehicle 20. When the object is a moving object, the determination unit 120 further determines a moving direction and speed of the moving object. Then, the determination unit 120 adds these pieces of determined information to the detection information.

When determining whether there is the above-described possibility of collision, the determination unit 120 desirably further uses at least a part of the travel information. For example, the determination unit 120 determines a proceeding direction of the vehicle 20 by using the travel information. For example, the determination unit 120 determines whether the vehicle 20 accelerates or decelerates by using the travel information, and determines whether there is a possibility of collision by using a result of the determination. Further, the determination unit 120 determines the proceeding direction of the vehicle 20 by using the route guidance information, and determines whether there is another object in the proceeding direction. Note that, the determination unit 120 may determine the proceeding direction of the vehicle 20 by using a road surface marking on a lane in which the vehicle proceeds.

When a possibility of collision is detected by the determination unit 120, the evaluation unit 130 determines, by using the travel information, whether a driver has performed an operation for reducing the possibility of collision, and evaluates the driver, based on a result of the determination. It is desirable that the evaluation unit 130 evaluates a driver by further using the detection information.

Specific examples of processing by the determination unit 120 and the evaluation unit 130 are, for example, as follows.

Example 1

When recognizing that there is an object such as a pedestrian or another vehicle within a predetermined distance in front of the vehicle 20, the determination unit 120 determines that there is a possibility that the vehicle 20 collides with the another vehicle or the pedestrian. At this occasion, the determination unit 120 may determine a magnitude of a possibility of collision by using a moving direction and velocity of the object. In this case, the evaluation unit 130 performs evaluation of a driver, for example, according to timing and strength at which the driver steps on a brake.

Example 2

When recognizing that there is a pedestrian crossing in the proceeding direction of the vehicle 20, for example, in front of the vehicle 20, and that a pedestrian stands still in front of the pedestrian crossing, the determination unit 120 determines that there is a possibility that the vehicle 20 collides with the pedestrian. In this case, when the vehicle 20 stops in front of a stop line in front of the pedestrian crossing and within a reference distance from the stop line, and a brake strength at that time is equal to or less than a reference value, that is, an absolute value of acceleration in a negative direction is equal to or less than a reference value, the evaluation unit 130 highly evaluates a driver for stopping the vehicle 20 with a sufficient margin. Meanwhile, when the vehicle 20 suddenly stops at the stop line in front of the pedestrian crossing, the vehicle 20 stops after crossing the stop line, or the vehicle 20 stops in front of the stop line and at a reference distance or further away from the stop line, the evaluation unit 130 evaluates a driver in a moderate level. Meanwhile, when the vehicle 20 passes the pedestrian crossing without stopping, the evaluation unit 130 lowers evaluation of a driver.

Example 3

When there is at least one of a road surface marking and a traffic sign, for temporary stop in the proceeding direction of the vehicle 20, for example, in front of the vehicle 20, the determination unit 120 determines that there is a possibility that the vehicle 20 collides with another object. In this case, when the vehicle 20 stops in front of a stop line for a temporary stop and within a reference distance from the stop line, a brake strength at that time is equal to or less than a reference value, the vehicle 20 remains in a temporary stop state for equal to more than a reference time, and the vehicle 20 starts slowly, the evaluation unit 130 highly evaluates a driver. Meanwhile, when the vehicle 20 suddenly stops at the stop line for the temporary stop, the vehicle 20 stops after crossing the stop line, the vehicle 20 stops in front of the stop line and at a reference distance or further away from the stop line, or the vehicle 20 does not remain in a temporary stop state for the reference time, the evaluation unit 130 evaluates a driver in a moderate level. Meanwhile, when the vehicle 20 does not stop temporally, the evaluation unit 130 lowers evaluation of a driver.

Example 4

When there is a traffic light in the proceeding direction of the vehicle 20, for example, in front of the vehicle 20, and the traffic light turns yellow when distance between the traffic light and the vehicle 20 is equal to or more than a reference value, that is, a distance being sufficient for the vehicle 20 to stop safely is secured, the determination unit 120 determines that there is a possibility that the vehicle 20 collides with another object. In this case, when the vehicle 20 stops in front of a stop line of an intersection and within a reference distance from the stop line, and a brake strength at that time is equal to or less than a reference value, the evaluation unit 130 highly evaluates a driver. Meanwhile, when the vehicle 20 suddenly stops at a stop line in front of the traffic light, the vehicle 20 stops after crossing the stop line, the vehicle 20 stops in front of the stop line and at a reference distance or further away from the stop line, or the vehicle 20 suddenly starts after stopping, the evaluation unit 130 evaluates a driver in a moderate level. Meanwhile, when the vehicle 20 enters the intersection, the evaluation unit 130 lowers evaluation of a driver.

Example 5

When the vehicle 20 turns right or left at an intersection and there is a person or a bicycle on a pedestrian crossing located in the proceeding direction of the vehicle 20, or in front of the intersection, the determination unit 120 determines that there is a possibility that the vehicle 20 collides with the person or the bicycle. In this case, when the vehicle 20 stops in front of the pedestrian crossing, a brake strength at that time is equal to less than a reference value, and the vehicle 20 starts slowly after the person or the bicycle is sufficiently far from the vehicle 20, the evaluation unit 130 highly evaluates a driver. Meanwhile, when the vehicle 20 suddenly stops in front of the pedestrian crossing, the vehicle 20 stops after entering the pedestrian crossing, the vehicle 20 suddenly starts after stopping, or the vehicle 20 starts before the person or the bicycle is sufficiently away from the vehicle 20, the evaluation unit 130 evaluates a driver in a moderate level. Meanwhile, when the vehicle 20 enters the intersection, the evaluation unit 130 lowers evaluation of a driver.

Example 6

When there is another vehicle, for example, a bicycle or a motorcycle, proceeding in a same lane as the vehicle 20 in front of the vehicle 20, and a relative distance between the vehicle 20 and the another vehicle gradually decreases, the determination unit 120 determines that there is a possibility that the vehicle 20 collides with the another vehicle. In this case, when a distance between the vehicle 20 and the another vehicle is sufficient in a state where an oncoming vehicle is close, the vehicle 20 passes the another vehicle after becoming a state where the oncoming vehicle is no longer close, and there is a sufficient distance between the vehicle 20 and the another vehicle at timing when the vehicle 20 enters an opposing lane for passing, the evaluation unit 130 highly evaluates a driver. Further, when the vehicle 20 passes the another vehicle in a state where the oncoming vehicle is a little close, not to say dangerously close, or when the distance between the vehicle 20 and the another vehicle is insufficient, not to say dangerous, the evaluation unit 130 evaluates a driver in a moderate level. Meanwhile, when the vehicle 20 passes the another vehicle when the oncoming vehicle is close enough to be dangerous, or when the distance between the vehicle 20 and the another vehicle is short enough to be dangerous at the timing when the vehicle 20 enters the opposing lane for passing, the evaluation unit 130 lowers evaluation of a driver.

Note that, desirably, "a state where the oncoming vehicle is a little close, not to say dangerously close" and "when the distance between the vehicle 20 and the another vehicle is insufficient, not to say dangerous" are both set in advance as ranges of a distance. This range of a distance may be fixed value, or may be set by using a function or a table using at least one of a travel condition of the vehicle 20 and a travel environment of the vehicle 20 as a parameter. The travel condition used herein is, for example, velocity of the vehicle 20. Further, the travel environment used herein is, for example, at least one of a speed limit of a load on which the vehicle 20 travels and velocity of another vehicle. Then, the determination unit 120 determines that a distance is sufficient when the distance is longer than this range, and determines that a distance is dangerous when the distance is shorter than this range.

In addition, the evaluation unit 130 lowers evaluation of a driver in the following cases.

A case where it is raining and a pedestrian is detected on a sidewalk, but passing by the pedestrian without slowing down A case of passing a railroad crossing without a temporary stop and a safety check A case of suddenly cutting in or merging into traffic, for example, a case of cutting in or merging on a highway without securing a sufficient following distance or without lowering velocity A case of swerving while traveling, for example, a case of not being aware of an obstacle ahead until coming right in front of the obstacle A case where a light is turned on after it is completely dark, or a case where no light is turned on after it is completely dark A case where a high-beam light is turned on in a state where there is an oncoming vehicle or a vehicle ahead A case where timing at which a blinker is turned on is immediately before a steering wheel is turned when turning right or left at an intersection or changing a traveling lane, or a case of turning right, turning left, or changing a traveling lane without turning on a blinker.

Further, the evaluation unit 130 stores an evaluation result of a driver in the storage unit 140, in association with the identification information acquired by the acquisition unit 110. Herein, the evaluation unit 130 may store, in the storage unit 140, evaluation results for all locations where evaluation of the driver are executed, or may store, in the storage unit 140, at least one of, or for example, both of an evaluation result at a location where the driver is highly evaluated and an evaluation result at a location where the driver is lowly evaluated.

Further, when storing the evaluation result in the storage unit 140, the evaluation unit 130 may store, in the storage unit 140, a position of the vehicle 20 at a time when the evaluation result is acquired. In this way, a user of the evaluation apparatus 10 can recognize a location where a collision between the vehicle 20 and another object may occur, by statistically processing information stored in the storage unit 140. The evaluation unit 130 may execute the statistical processing.

Then, a driver of the vehicle 20 later confirms the information stored in the storage unit 140. For example, a driver transmits the identification information to the evaluation apparatus 10 via a terminal. Then, the evaluation unit 130 of the evaluation apparatus 10 reads information associated with the identification information from the storage unit 140, and transmits the read information to the terminal. The information transmitted to the terminal includes, for example, a location of evaluation, an evaluation result, and an image used at that time.

The evaluation unit 130 may aggregate, for each piece of the identification information, at least one of a condition that has resulted in a low evaluation result and a condition that has resulted in a high evaluation result, and transmit a result of the aggregation to a terminal of a driver. The condition herein is, for example, information indicating a traffic rule at a location of evaluation, such as a specific traffic sign and a road surface marking, or meanings thereof. In this way, a driver of the vehicle 20 can recognize his or her own driving tendency. Note that, the evaluation unit 130 may transmit advice information to a terminal of a driver, together with the aggregation result.

Note that, when the evaluation apparatus 10 executes the above-described processing in real time, the evaluation unit 130 may transmit the evaluation result to the communication unit 230 of the vehicle 20. In this case, the communication unit 230 may display the evaluation result in real time on a display inside the vehicle 20 or on a portable terminal brought in the vehicle 20. Note that, when the vehicle 20 is equipped with a light emission apparatus being in a field of vision of a driver, the communication unit 230 may notify the driver of the evaluation result by using the light emission apparatus. As one example, the communication unit 230 changes, according to the evaluation result, at least one of a light emission color and a light emission pattern of the light emission apparatus. Herein, the evaluation unit 130 and the communication unit 230 may execute the processing of notifying a driver only when the evaluation result is low or only when the evaluation result is high.

Further, the information stored in the storage unit 140 may be used in setting a premium for automobile insurance for the driver. For example, for a driver having high evaluation information, a premium for auto mobile insurance is set to be low: In this case, the evaluation unit 130 transmits evaluation information stored in the storage unit 140 to a server that executes processing of setting the premium or to a storage apparatus used by the server.

Further, the evaluation unit 130 may execute processing of giving a point by each piece of the identification information, by using the evaluation information stored in the storage unit 140. One example of the processing is to transmit the evaluation information stored in the storage unit 140 to a server that executes the processing of giving a point or to a storage apparatus used by the server. The point given herein is, for example, used to provide a service or goods to a driver.

Figure 3:
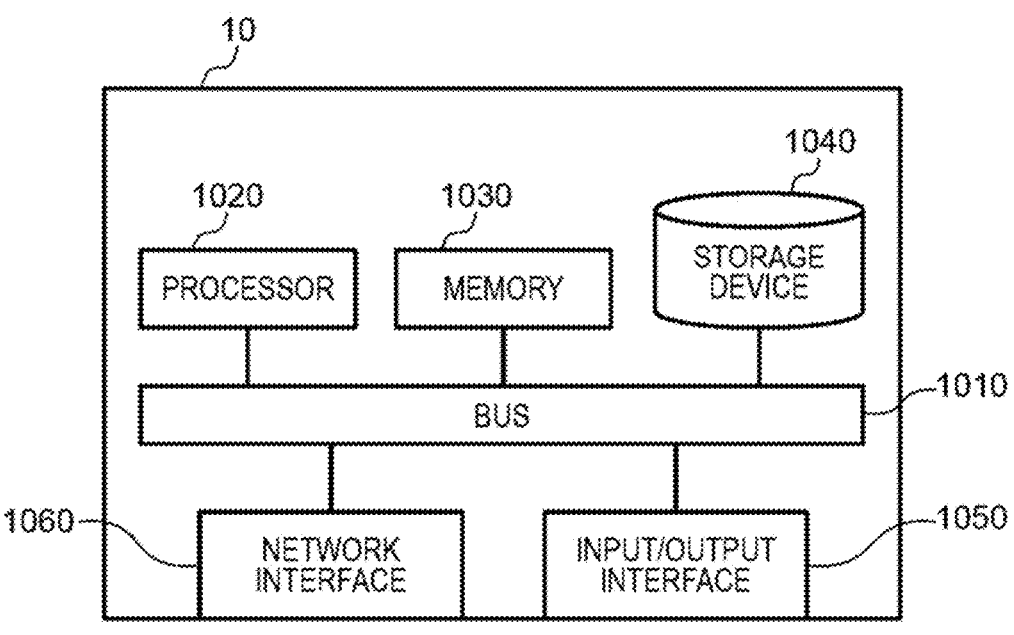
FIG. 3 It is a diagram illustrating a hardware configuration example of the evaluation apparatus.

FIG. 3 is a diagram illustrating a hardware configuration example of the evaluation apparatus 10. The evaluation apparatus 10 includes a bus 1010, a processor 1020, a memory 1030, a storage device 1040, an input/output interface 1050, and a network interface 1060.

The bus 1010 is a data transmission path for the processor 1020, the memory 1030, the storage device 1040, the input/output interface 1050, and the network interface 1060 to transmit and receive data to and from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a removable medium such as a memory card, a read only memory (ROM), or the like. The storage device 1040 stores a program module that achieves each function (for example, the acquisition unit 110, the determination unit 120, and the evaluation unit 130) of the evaluation apparatus 10. By the processor 1020 reading and executing each of these program modules on the memory 1030, each function related to the program module is achieved. Further, the storage device 1040 also functions as the storage unit 140.

The input/output interface 1050 is an interface for connecting the evaluation apparatus 10 with various pieces of input/output equipment.

The network interface 1060 is an interface for connecting the evaluation apparatus 10 to a network. The network is, for example, a local area network (LAN) and a wide area network (WAN). A method in which the network interface 1060 connects to the network may be wireless connection, or may be wired connection. The evaluation apparatus 10 may communicate with the communication unit 230 via the network interface 1060.

Figure 4:
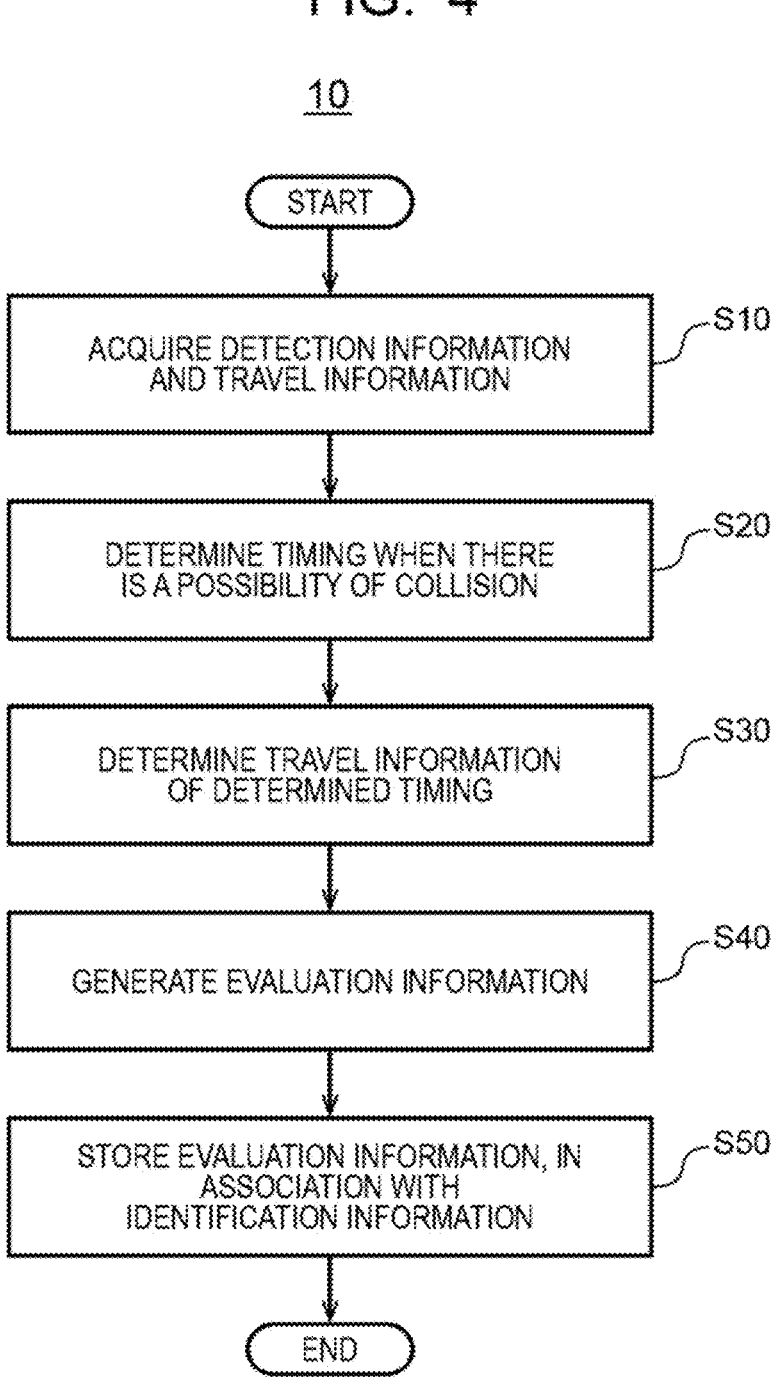
FIG. 4 It is a flowchart illustrating one example of an operation of the evaluation apparatus.

FIG. 4 is a flowchart illustrating one example of operation of the evaluation apparatus 10. The acquisition unit 110 preliminarily acquires identification information of the vehicle 20 or a driver to be processed. First, the acquisition unit 110 reads detection information and travel information associated with the identification information, from the storage unit 140 (step S10). The determination unit 120 determines timing when there is a possibility of the vehicle 20 to collide with an object, by using at least the detection information (step S20). The evaluation unit 130 determines travel information corresponding to the timing determined in step S20, (step S30), and generate, by using at least the travel information, evaluation information at the determined timing (step S40). Then, the evaluation unit 130 stores the generated evaluation information in the storage unit 140, in association with the identification information (step S50). Details of steps S30 to S50 are as described with reference to FIG. 2.

As described above, according to the present example embodiment, the evaluation apparatus 10 includes the acquisition unit 110, the determination unit 120, and the evaluation unit 130. The determination unit 120 determines whether there is a possibility that the vehicle 20 collides with another object, for example, a moving object such as a pedestrian or another vehicle. When there is a possibility of collision, the evaluation unit 130 determines whether a driver of the vehicle 20 has performed an operation for reducing the possibility of collision, and evaluates the driver, based on a result of the determination. Thus, when the evaluation apparatus 10 is used, a driver can be evaluated by using a new index.

While the example embodiment of the present invention has been described with reference to the drawings, the example embodiment is an exemplification of the present invention, and various configurations other than the above-described configuration may also be employed.

Further, in a plurality of flowcharts referred to in the above description, a plurality of steps (pieces of processing) are described in order, but an execution order of the steps executed in each example embodiment is not limited to the described order. In each example embodiment, the illustrated order of the steps may be changed to an extent that contents thereof are not interfered. Further, each of the above described example embodiments may be combined to an extent that contents thereof does not conflict with each other.

A part or the entirety of the above-described example embodiment may be described as the following supplementary notes, but is not limited thereto.

1. An evaluation apparatus, including:

an acquisition unit that acquires detection information indicating a result of detecting a periphery of a vehicle by a sensor, and travel information of the vehicle;

a determination unit that determines, by using the detection information, whether there is a possibility of collision between the vehicle and another object; and an evaluation unit that determines, by using the travel information at a time when the possibility of collision is detected, whether a driver of the vehicle has performed an operation for reducing the possibility of collision, and evaluates the driver based on a result of the determination.

2. The evaluation apparatus according to the above described 1, wherein
the determination unit determines whether there is the possibility of collision by further using the travel information.

3. The evaluation apparatus according to the above described 1 or 2, wherein
the evaluation unit generates the result of determination by further using the detection information.

4. The evaluation apparatus according to any one of the above described 1 to 3, wherein
the travel information includes route guidance information provided to the vehicle.

5. The evaluation apparatus according to any one of the above described 1 to 4, wherein
the acquisition unit acquires, in association with the detection information and the travel information, position information indicating a position of the vehicle, and
the determination unit stores, in a storage unit, a position of the vehicle at a time when the possibility of collision is detected.

6. The evaluation apparatus according to any one of the above described 1 to 5, wherein
the another object is at least one of a pedestrian, a bicycle, and a motorcycle.

7. The evaluation apparatus according to any one of the above described 1 to 6, wherein
the detection information includes a position and a moving direction of the another object.

8. The evaluation apparatus according to any one of the above described 1 to 7, wherein
the detection information includes a type of at least one of a road surface marking and a traffic sign.

9. An evaluation method including,
by a computer:
   acquiring detection information indicating a result of detecting a periphery of a vehicle by a sensor, and travel information of the vehicle;
   determining, by using the detection information, whether there is a possibility of collision between the vehicle and another object; and
   determining, by using the travel information at a time when the possibility of collision is detected, whether a driver of the vehicle has performed an operation for reducing the possibility of collision, and evaluating the driver based on a result of the determination.

10. The evaluation method according to the above described 9, further including,
by the computer,
determining whether there is the possibility of collision by further using the travel information.

11. The evaluation method according to the above described 9 or 10, further including, by the computer,
generating the result of determination by further using the detection information.

12. The evaluation method according to any one of the above described 9 to 11, wherein
the travel information includes route guidance information provided to the vehicle.

13. The evaluation method according to any one of the above described 9 to 12, further including,
by the computer:

acquires, in association with the detection information and the travel information, position information indicating a position of the vehicle; and
storing, in a storage unit, a position of the vehicle at a time when the possibility of collision is detected.

14. The evaluation method according to any one of the above described 9 to 13, wherein
the another object is at least one of a pedestrian, a bicycle, and a motorcycle.

15. The evaluation method according to any one of the above described 9 to 14, wherein
the detection information includes a position and a moving direction of the another object.

16. The evaluation method according to any one of the above described 9 to 15, wherein
the detection information includes a type of at least one of a road surface marking and a traffic sign.

17. A program causing a computer to include:
an acquisition function of acquiring detection information indicating a result of detecting a periphery of a vehicle by a sensor, and travel information of the vehicle;
a determination function of determining, by using the detection information, whether there is a possibility of collision between the vehicle and another object; and
an evaluation function of determining, by using the travel information at a time when the possibility of collision is detected, whether a driver of the vehicle has performed an operation for reducing the possibility of collision, and evaluating the driver based on a result of the determination.

18. The program according to the above described 17, wherein
the determination function determines whether there is the possibility of collision by further using the travel information.

19. The program according to the above described 17 or 18, wherein
the evaluation function generates the result of determination by further using the detection information.

20. The program according to any one of the above described 17 to 19, wherein
the travel information includes route guidance information provided to the vehicle.

21. The program according to any one of the above described 17 to 20, wherein
the acquisition function acquires, in association with the detection information and the travel information, position information indicating a position of the vehicle, and
the determination function stores, in a storage unit, a position of the vehicle at a time when the possibility of collision is detected.

22. The program according to any one of the above described 17 to 21, wherein
the another object is at least one of a pedestrian, a bicycle, and a motorcycle.

23. The program according to any one of the above described 17 to 22, wherein
the detection information includes a position and a moving direction of the another object.

24. The program according to any one of the above described 17 to 23, wherein
the detection information includes a type of at least one of a road surface marking and a traffic sign.

REFERENCE SIGNS LIST

10 Evaluation apparatus
20 Vehicle

110 Acquisition unit
120 Determination unit
130 Evaluation unit
140 Storage unit
210 Sensor
220 Travel information acquisition unit
230 Communication unit

What is claimed is:

1. An evaluation apparatus, comprising:
at least one memory configured to store instructions; and
at least one processor configured to execute the instructions to:
acquire detection information indicating a result of detecting a periphery of a vehicle by a sensor, and travel information of the vehicle;
determine, by using the detection information, timing when there is a possibility of collision between the vehicle and another object; and
determine, by using the travel information corresponding to the timing determined, whether a driver of the vehicle has performed an operation for reducing the possibility of collision; and
decrease an evaluation of the driver in a case where it is determined that the driver of the vehicle has not performed the operation for reducing the possibility of collision.

2. The evaluation apparatus according to claim 1, wherein the at least one processor is further configured to execute the instructions to
determine whether there is the possibility of collision by further using the travel information.

3. The evaluation apparatus according to claim 1, wherein the at least one processor is further configured to execute the instructions to
generate the result of determination by further using the detection information.

4. The evaluation apparatus according to claim 1, wherein the travel information includes route guidance information provided to the vehicle.

5. The evaluation apparatus according to claim 1, wherein the at least one processor is further configured to execute the instructions to:
acquire, in association with the detection information and the travel information, position information indicating a position of the vehicle; and
store, in a storage unit, a position of the vehicle corresponding to the timing determined.

6. The evaluation apparatus according to claim 1, wherein the another object is at least one of a pedestrian, a bicycle, and a motorcycle.

7. The evaluation apparatus according to claim 1, wherein the detection information includes a position and a moving direction of the another object.

8. The evaluation apparatus according to claim 1, wherein the detection information includes a type of at least one of a road surface marking and a traffic sign.

9. The evaluation apparatus according to claim 1, wherein the at least one processor is further configured to execute the instructions to:
decrease the evaluation in real time; and
transmit the evaluation to a communication apparatus of the vehicle and cause the communication apparatus to output information indicating the evaluation to an output apparatus of the vehicle.

10. The evaluation apparatus according to claim 9, wherein the output apparatus of the vehicle comprises at least one: of a display inside the vehicle, a portable terminal brought into the vehicle, or a light emission apparatus inside the vehicle.

11. The evaluation apparatus according to claim 10, wherein the at least one processor is further configured to execute the instructions to:
control, according to the evaluation result, the light emission apparatus to change at least one of a light emission color and a light emission pattern.

12. The evaluation apparatus according to claim 1, wherein the at least one processor is further configured to execute the instructions to:
store, in a storage apparatus, evaluations respectively corresponding to each of a plurality of drivers, the evaluations being respectively associated with identification information of each driver and a vehicle location where each of the evaluations were obtained; and
determine and output a location where a collision between the vehicle and another object may occur by executing statistical processing of the evaluations stored in the storage apparatus.

13. The evaluation apparatus according to claim 12, wherein the at least one processor is further configured to execute the instructions to:
read, upon receiving identification information from a terminal of a driver of the plurality of drivers, information associated with the identification information from the storage apparatus; and
transmit the information read to the terminal,
wherein the information comprises: a location where the evaluation is executed, an evaluation result of the evaluation, and an image used at a time when the evaluation is executed.

14. The evaluation apparatus according to claim 13, wherein the at least one processor is further configured to execute the instructions to:
aggregate, for each piece of the identification information, at least one of a condition that has resulted in a low evaluation result and a condition that has resulted in a high evaluation result;
transmit a result of the aggregation to a terminal of the driver,
wherein the condition is information indicating a traffic rule at a location of evaluation, the information comprising a specific traffic sign, a road surface marking, and/or meanings thereof.

15. The evaluation apparatus according to claim 1, wherein the at least one processor is further configured to execute the instructions to:
increase an evaluation of the driver in a case where it is determined that the driver of the vehicle has performed the operation for reducing the possibility of collision.

16. An evaluation method comprising,
by at least one processor:
acquiring detection information indicating a result of detecting a periphery of a vehicle by a sensor, and travel information of the vehicle;
determining, by using the detection information, timing when there is a possibility of collision between the vehicle and another object; and
determining, by using the travel information corresponding to the timing determined, whether a driver of the vehicle has performed an operation for reducing the possibility of collision;

decreasing an evaluation of the driver in a case where it is determined that the driver of the vehicle has not performed the operation for reducing the possibility of collision;

controlling, according to the evaluation, a light emission apparatus inside the vehicle to change at least one of a light emission color or a light emission pattern.

17. The evaluation method of claim 16, further comprising, increasing an evaluation of the driver in a case where it is determined that the driver of the vehicle has performed the operation for reducing the possibility of collision.

18. A non-transitory computer-readable storage medium storing a program that is configured to cause at least one processor to perform:

acquiring detection information indicating a result of detecting a periphery of a vehicle by a sensor, and travel information of the vehicle;

determining, by using the detection information, timing when there is a possibility of collision between the vehicle and another object; and determining, by using the travel information corresponding to the timing determined, whether a driver of the vehicle has performed an operation for reducing the possibility of collision, and decreasing an evaluation of the driver in a case where it is determined that the driver of the vehicle has not performed the operation for reducing the possibility of collision.

19. The non-transitory computer-readable storage medium of claim 18, wherein the program is further configured to cause the at least one processor to perform:

increasing an evaluation of the driver in a case where it is determined that the driver of the vehicle has performed the operation for reducing the possibility of collision.

\* \* \* \* \*